United States Patent
Colombo et al.

[15] 3,649,186
[45] Mar. 14, 1972

[54] CONTINUOUS PROCESS FOR OBTAINING HIGH-GRADE ZINC OXIDE FROM ZINC-CONTAINING MINERALS

[72] Inventors: Umberto Colombo, Novara; Giovanni Scacciati, Torino; Giuseppe Sironi, Novara; Amos Vaschetti, Torino, all of Italy

[73] Assignees: Montecatini Edison S.p.A.; Montiponi E Montevecchio S.p.A., Milan, Italy, part interest to each

[22] Filed: Jan. 25, 1968

[21] Appl. No.: 700,498

[30] Foreign Application Priority Data

Aug. 1, 1967 Italy.................................19,081 A/67

[52] U.S. Cl........................................23/148, 23/1 E, 55/72
[51] Int. Cl..................C01g 9/02, B01d 51/00, B01d 59/28
[58] Field of Search...........................23/148, 1 F; 55/23, 72

[56] References Cited

UNITED STATES PATENTS 2,747,966   5/1956   Calbeck...................................23/148

*Primary Examiner*—Earl C. Thomas
*Assistant Examiner*—Hoke S. Miller
*Attorney*—Curt M. Avery, Arthur E. Wilfond, Herbert L. Lerner and Daniel J. Tick

[57] ABSTRACT

A continuous process for obtaining zinc oxide of a grade higher than 75 percent from oxidized zinciferous ores, which comprises: Preheating the zinc-containing mineral and calcining it at temperatures above 800° C. (preferably at 900°–1,000° C.) by the combustion products of the gases leaving the reducing reactor. Treating the calcined ore in a fluidized bed at a temperature of from 1,000 to 1,200° C. with reducing gases obtained by direct injection of a hydrocarbon fuel and of an amount of air less than stoichiometric into the fluid bed and discharging the zinc-free residues. Burning the reducing gas of the reduction stage containing the metallic zinc vapors with air to produce a burnt gas containing $CO_2$, $H_2O$ and $ZnO$. Using the burnt gas to preheat the air necessary for the partial combustion of the fuel by indirect heat exchange and the incoming zinciferous ore by direct heat exchange. Subjecting the off gases, after having released part of their heat to the air and to the ore, to separation in order to recover the zinc oxide.

6 Claims, 3 Drawing Figures

CONTINUOUS PROCESS FOR OBTAINING HIGH-GRADE ZINC OXIDE FROM ZINC-CONTAINING MINERALS

The treatment of oxidized zinciferous ores, particularly those containing considerable quantities of silicate, raises problems which have not previously been satisfactorily solved either technically or economically.

These ores often can be concentrated by flotation or by sink flotation up to only a maximum content of zinc of from 30 to 40 percent. Even after enrichment, however, they still contain excessive quantities of dolomitic, quartziferous or limonitic gangue which make the subsequent recovery of the metal difficult in either thermal processes with horizontal or vertical retorts, or electrolytic processes. In order to attain a further enrichment of zinc, the concentrates are usually subjected to an intermediate pyrometallurgical treatment to obtain a more easily workable product. This treatment (Waelz process) is usually carried out in long rotary furnaces, into which a charge of concentrate mixed with coke is introduced. The zinc of the charge, at the high temperatures attained at the terminal part of the furnace, is reduced to metal and vaporizes. The vaporized zinc is then oxidized to ZnO by the gases, which circulate in countercurrent to the ore. After cooling down, the gases are filtered through bag filters or through electrostatic filters, thereby recovering a material containing 75–90 percent of ZnO.

This process has numerous drawbacks, namely: the large size of the furnace which is filled only to a small extent by the charge; the heavy wear of the refractories in the terminal zone; the formation of rings of ore, sticking to the walls, which hinder the movement of the material; and the necessity of keeping the entire heavy installation in rotation.

In order to obviate these drawbacks, it has been suggested to treat the material in a fluidized bed at a high temperature with reducing gases. U.S. Pat. No. 2,747,966 to J. Calbeck, for example, describes a process for the recovery of zinc from oxidized minerals, fluidized through combustion in a bed of air and methane. The process is conducted in alternate stages. In the first stage, the methane is burnt completely with air in order to bring the solids of the bed up to the ZnO reduction temperature. In the subsequent stage, the methane is burnt with air by partial combustion, thereby generating a reducing gas which reduces the ZnO to Zn and removes the zinc as a vapor. The heat necessary for the endothermic reduction to metal is provided by the heat accumulated during the preceding stage.

This alternation of heating and reducing treatments itself involves quite a number of drawbacks. These are the possibility of de-fluidization of the bed in the heating stage, as a result of the higher temperatures attained; frequent thermal stresses in the refractories which are subjected to rapid temperature variations; as well as considerable complications in the control of the combustion and, thus, the whole process in general.

We are able to obviate these drawbacks by continuously reducing zinc oxide to zinc in a fluid bed, under uniform conditions of temperature and composition of the reducing gases, and eliminating the alternations of cycles. This result is achieved by continuously injecting into the reactor a gaseous or liquid fuel and an amount of air less than stoichiometrically required for total combustion.

The fuel is a hydrocarbon fuel. The use of heavy fuel oil such as Bunker Oil C, which is easily available at a low price, is particularly convenient from an economical point of view.

The operational conditions which determine the air/fuel weight ratio are numerous, the most important being:

The temperature of the fluidized bed. This determines the velocity of reduction of the zinc ore, and the maximum concentration of the vapors of zinc that can pass over into the gases.

The quantity of heat recovered through the preheating of both the zinciferous ore and the air introduced into the reducing bed, by using the sensible heat and the heat of combustion available in the hot reducing gases at the outlet of the reducing stage.

As a matter of fact, the reduction reactions of the zinc oxide and zinc silicate present in the ore or in the concentrate are strongly endothermic and consume much heat. Further heat is required to bring the air, the fuel and the ore from their respective preheating temperatures to the temperature of the reaction bed or at least to 1,000° C., and to make up for the heat losses from the reactor. The quantity of heat required for such needs is supplied by the partial and controlled combustion with air, of the fuel injected into the fluidized bed. Because of the intensive movement of the suspended particles, this combustion is very regular, takes place without local overheating, with minimum cracking, and supplies a gas with a high reducing power.

If one increases the air/fuel weight ratio, one obtains a greater quantity of heat, while simultaneously decreasing the reducing power of the gases formed. The reducing power is the ratio between the sum of the reducing components ($CO + H_2$) and the sum of the oxidized components ($CO_2 + H_2O$). At a limit, using the exact amount of air for the complete combustion of the fuel generates the maximum quantity of heat, which is equal to its lower calorific power, although one obtains gases with a zero reducing power.

Simple thermodynamical considerations, applied to the process of volatilization of the zinc present as either the oxide or silicate, show that the concentration of zinc vapor in the gases leaving the reactor is approximately proportional, for each temperature, to the reducing power of the gases. It is therefore convenient to reduce the supply of heat to the fluidized bed to the necessary minimum, so as to burn the fuel, gaseous or liquid, with the minimum amount of air so as to obtain a fluidizing gas having the greatest possible reducing power. The fuel/mineral weight ratio is in general from 0.25 to 0.35 while the air/fuel ratio is from 3 to 6 $Nm^3/kg$. The term $Nm^3$ as used conventionally means cubic meters of air if reduced to standard conditions, i.e., 0° C. and 1 atmosphere. The air is used in an amount of from 30 to 50 percent of the stoichiometric amount for the total combustion.

Figure 1:
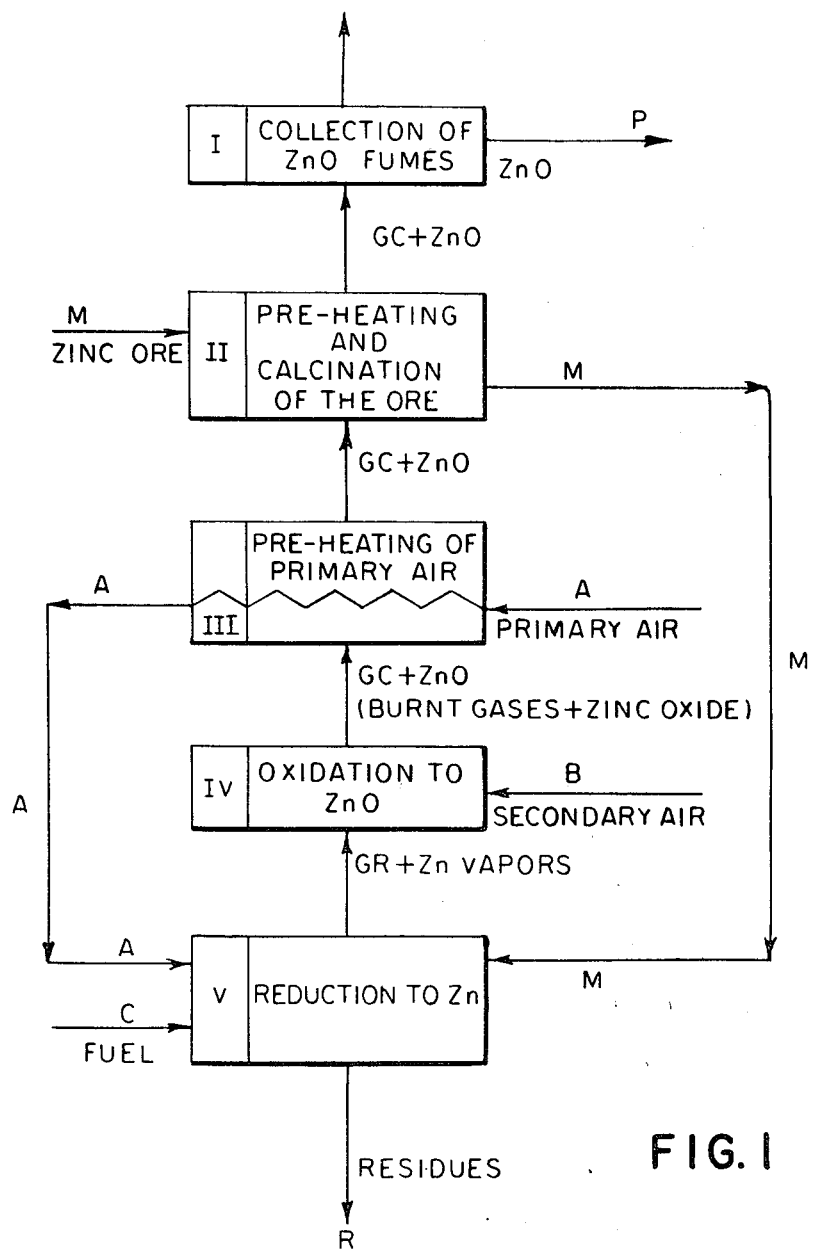
FIG. 1 shows diagrammatically the overall recovery process of zinc from oxidized zinciferous ores or minerals or from concentrates thereof according to the present invention.

The process shown in FIG. 1 can be divided into two basic steps:

A. Precalcination of the mineral and preheating of the air.

The reducing gases GR, containing the zinc vapors leaving the reducing zone V, are burned with secondary air B in zone IV to transform CO, $H_2$ and Zn respectively into $CO_2$, $H_2O$ and ZnO. The released heat is first utilized to preheat the primary air A in zone III, which air is sent into the fluidized bed, and then utilized for preheating and calcining the zinciferous material M in zone II. Subsequently, the burnt gases GC containing the zinc oxide in suspension, have the ZnO stripped therefrom in zone I by either filtration (bag) or electrostatic precipitation. Thus, the rich zinc-containing solids (with a content of 75–90 percent ZnO) are collected and used for the recovery of the metal by thermal or electrolytic methods.

It is necessary in stage II of the preheating of the zinciferous mineral or concentrate, to exceed 800° C. in order to decompose the carbonates of zinc, calcium and magnesium and to completely remove the hydration water of hemimorphite [$Zn_4(OH)Si_2O_7 \cdot H_2O$]. The carbon dioxide of the carbonates and the water of hydration of the silicate, if they were not removed at this stage of the process, would be produced inside the fluid bed reactor, thereby diminishing the reducing power of the gases used and hindering the dezincification of the ore.

At least 60 percent of the mineral M, in order to be fluidized, must have a granulometry of less than 5 mm. and more than 0.04 mm. The fluidizing gases preferably have a speed from 0.5 to 2 m./sec.

B. Volatilization of zinc in a fluidized bed of ore or concentrate.

The material M, precalcinated in II, is introduced into the fluidized-bed reactor V, into which the liquid or gaseous fuel C, used in the reduction, is injected through a row of lateral nozzles. The air A, preheated in III, is conveyed through a suitable distributor to the bottom of the bed wherein it partially burns the fuel C, thereby generating the reducing fluidizing gases and bringing the temperature up to 1,000°–1200° C. Instead of air A, oxygen or enriched air may also be used.

The following endothermic reactions take place in the bed between the solid and the gas:

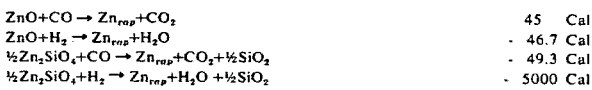

| | |
|---|---|
| $ZnO + CO \rightarrow Zn_{vap} + CO_2$ | 45 Cal |
| $ZnO + H_2 \rightarrow Zn_{vap} + H_2O$ | - 46.7 Cal |
| $½Zn_2SiO_4 + CO \rightarrow Zn_{vap} + CO_2 + ½SiO_2$ | - 49.3 Cal |
| $½Zn_2SiO_4 + H_2 \rightarrow Zn_{vap} + H_2O + ½SiO_2$ | - 5000 Cal |

The residues R, which are discharged from the furnace, still contain about 5 percent of the zinc initially present in the starting material.

Advantages of our process are:
Less apparatus, hence lower cost.
Absence of parts moving at high temperatures.
Use of fuel oil or gas, that is, of cheap fuel.
Effective heat recovery.

Figure 2:
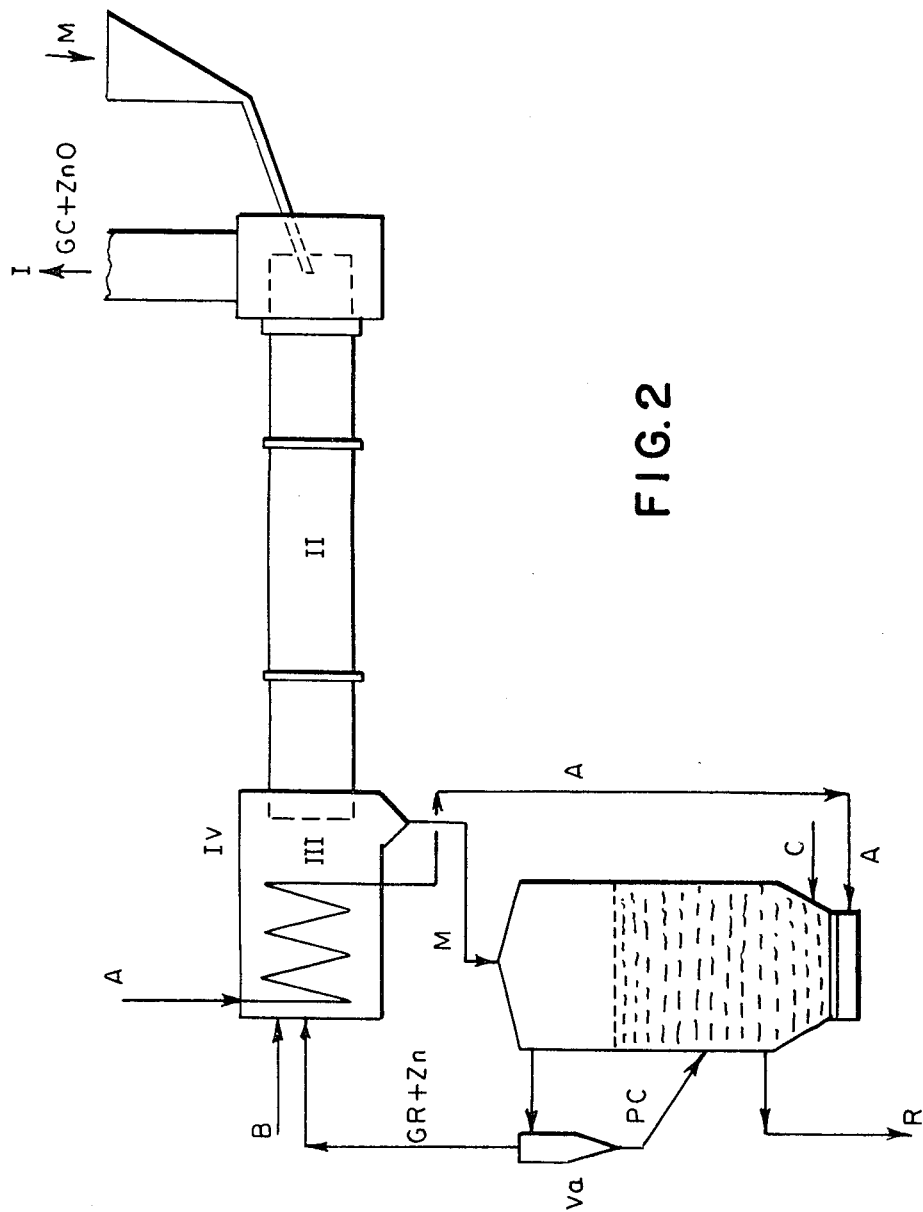
FIG. 2 shows one apparatus for carrying out the invention.
Figure 3:
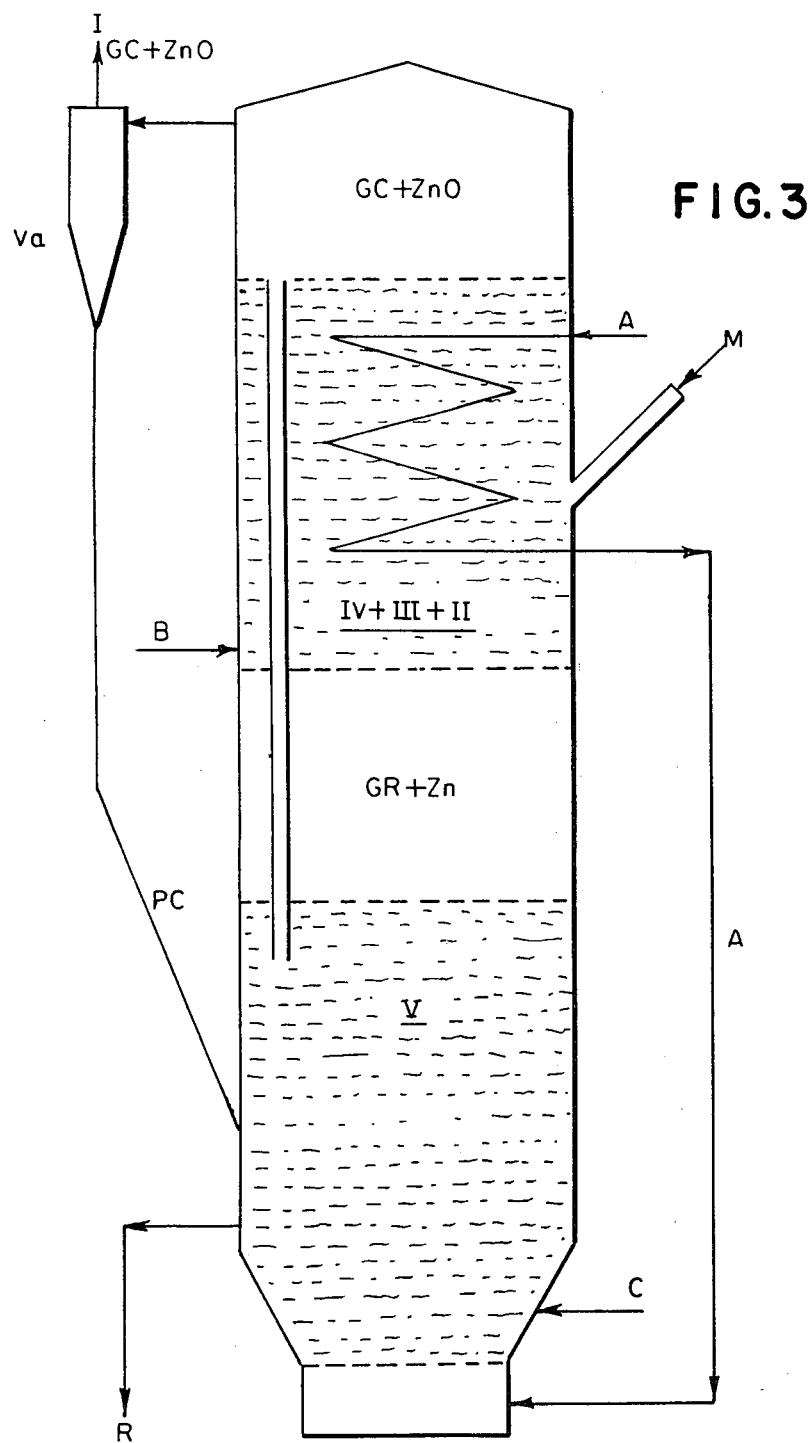
FIG. 3 shows another apparatus for carrying out the invention.

The invention will now be illustrated by two examples with respective reference to FIGS. 2 and 3. These examples are merely illustrative and are not to be considered limitative of our invention.

EXAMPLE 1 (FIG. 2)

1,000 kg./hr. of zinc oxide containing concentrate M, ground to a particle size of less than 1 mm. (having a moisture content of 10 percent) and having the following composition (based on the dry substance): Zn=25.0 percent; Pb=1.2 percent; $Fe_2O_3$=18.9 percent; CaO=7.9 percent; MgO=3.8 percent; $SiO_2$=9.3 percent; $CO_2$=15.8 percent; combined water = 5 percent, were fed through a dosing hopper H into the rotary furnace of FIG. 2. In the terminal part of rotary furnace II, the material attains a temperature of 900°-1,000° C. This temperature is sufficient to decompose all of the carbonates and hydrates present. The loss of weight based on the starting dry material amounts to 20 percent.

From the rotary furnace the calcined zinciferous concentrate M continuously enters the fluidized-bed reactor V, which operates at 1,100° C. Fuel oil C and primary air A preheated to 500° C. are injected into this reactor at its base. The exhausted residues R (440 kg./hr.) are continuously discharged from the reducing bed V. They contain 2.8 percent of Zn, corresponding to 5 percent of the zinc contained in the starting concentrate M.

The primary air A is fed into the system at a flow rate of 1,350 Nm.³/hr. This air is preheated to 500° C. in the heat exchanger III and is then injected into the bottom of the reactor V through a suitable distributor. 300 kg./hr. of fuel oil C (Bunker Oil C), having a net heat value of about 10,000 Cal./kg., are fed to the bottom of reactor V, through a series of radially arranged nozzles. The partial combustion of the oil with the air generates 1,950 Nm.³/hr. of reducing gas GR with a net heat value of 1,100 Cal/Nm.³ and having the following composition (by volume): $CO+H_2$=40 percent; $H_2O+CO_2$=4 percent; $N_2$=56 percent.

At the outlet of the fluidized bed, this gas containing about 4 percent by volume of zinc vapors flows through a cyclone Va, which is kept at a temperature of not less than 1,000° C. to avoid the formation of deposits (incrustations) of ZnO due to re-oxidation of the zinc vapors. The cyclone dusts PC, which gather at a rate of 100–120 kg./hr. and which contain from 12 to 15 percent of ZnO, are continuously recycled into the reducing bed V.

The reducing gases GR, on leaving the cyclone Va, are burned with secondary air B in slight excess (2100 Nm.³/hr.) in the combustion zone IV. The burnt gases GC yield part of their sensible and combustion heat first to the air A in the indirect heat exchanger III and then to the mineral M in the rotary furnace II. The burnt gases GC which contain the product leave the rotary furnace and are conveyed to an electrostatic filter I (not shown) in which the solids are collected at a rate of 330 kg./hr. with the following composition: ZnO=88 percent, PbO=3.5 percent, MgO=0.3 percent. The yield of zinc recovery is 93 percent of the zinc contained in the starting mineral M. The recovery of lead was 90 percent.

EXAMPLE 2

In FIG. 3, we use a zinc oxide containing mineral M (with a moisture content of about 12 percent), ground to less than 3 mm., and having the following chemical composition (dry basis): Zn=33.0 percent, Pb=2.7 percent, $Fe_2O_3$=15.4 percent, CaO=5.3 percent, MgO=2.6 percent, $SiO_2$=12.3 percent, $CO_2$=13.2 percent, combined water =6 percent.

The mineral M (1,000 kg./hr.) is continuously fed through a dosing hopper (not shown) to the upper part II + III + IV of a two-stage fluidized-bed reactor. In this stage, the ore is calcined at 950° C. by burning the gases GC coming from the lower zone V with air. The ore then passes through an overflow into the lower stage where, by the action of the reducing gases GR, the zinc oxide is reduced to zinc metal with the production of metallic zinc vapors. The temperature kept at this lower stage is 1,160° C. 340 kg./hr. of residues R containing 3.4 percent of Zn, which corresponds to 3.5 percent of the total zinc, are continuously discharged from the bottom of V.

The primary air A which is fed into the system at a flow rate of 1,370 Nm.³/hr. is preheated to 450°-500° C. in the heat exchanger immersed in the fluidized bed (II + III + IV) and is then introduced into the bottom of the fluidized bed V where the reduction of the zinc compounds takes place. 320 kg./hr. of crude oil C are also injected into this bed. From the partial combustion one obtains reducing gases GR with 38 percent of $(CO + H_2)$, which reduce the zinc compounds to metal and leave the fluidized bed V with about 4.5 percent by volume of metallic zinc vapors. These gases pass through the fluidized bed II + III + IV into which secondary air B is fed, in order to burn the CO and the $H_2$ and to oxidize the zinc vapors to oxide. The heat developed by the combustion is used for the calcining of mineral M and for the preheating of the primary air A. The burnt gases GC pass then through the cyclone Va where they yield almost the whole of the dusts PC dragged along. The latter, which amount to 50–60 kg./hr. are recycled continuously to the reducing reactor V, and are constituted by fine mineral and by ZnO.

The ZnO particles present in the burnt gases GC are not caught by the cyclone because of their extreme fineness with a diameter of less than 1 micron. They remain suspended in the burnt gases GC and are recovered in the electrostatic filter indicated at I. From this filter are discharged 450 kg./hr. of solids having the following composition: ZnO=86.0 percent, PbO=5.9 percent, MgO=0.4 percent. The recovery of zinc and lead was 93 percent and 92 percent respectively.

In all figures the same numerals and letters stand for the same features.

We claim:

1. A continuous process for obtaining zinc oxide of a grade higher than 75 percent from oxidized zinciferous ores, containing 25 to 40 percent zinc, by reduction of the ore with formation of metallic zinc vapors, and the subsequent oxidation thereof to zinc oxide, which comprises:

a. preheating and calcining the zinciferous mineral at temperatures above 800° C. by the combustion products of the gases leaving a subsequent reducing stage/(d)/(e);
   b. treating the calcined ore in a fluidized bed at from 1,000° to 1,200° C. with reducing gases obtained by the direct injection of a hydrocarbon fuel and of an amount of air less than stoichiometric into the fluidized bed and discharging the zincfree residues;

c. burning completely the reducing gas of the reduction stage containing the metallic zinc vapors with air to produce a burnt gas containing $CO_2$, $H_2O$ and ZnO;

d. using the burnt gases to preheat the air necessary for the partial combustion of the fuel by indirect heat exchange and the incoming zinc-containing ore by direct heat exchange;

e. subjecting the gases from (d), after having released part of their heat to the air and to the ore, to separation in order to recover the zinc oxide.

2. The process according to claim 1, wherein from 0.25 to 0.35 kg. of fuel are used per 1 kg. of ore.

3. The process of claim 1, wherein the air in (b) is from 30 to 50 percent of the theoretical for total combustion.

4. The process of claim 1, wherein in the reduction stage the reducing gases fluidize the bed at a speed of 0.5 to 2 m./sec.

5. The process of claim 1, wherein the preheating and calcining of the ore are carried out in a rotary furnace.

6. The process of claim 1, wherein the preheating and calcining of the ore, as well as the preheating of the air for step (b), are carried out in a unitary single fluidized-bed stage.

* * * * *